(12) United States Patent
Sung et al.

(10) Patent No.: US 9,661,396 B2
(45) Date of Patent: *May 23, 2017

(54) DIGITAL TV AND METHOD FOR CONTROLLING SAME

(71) Applicant: LG ELECTRONICS INC., Seoul (KR)

(72) Inventors: Chang Hun Sung, Seoul (KR); Hyun Sang Park, Seoul (KR); Tae Il Cho, Seoul (KR); Woo Hyun Paik, Seoul (KR); Kwan Hee Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 140 days.

This patent is subject to a terminal disclaimer.

(21) Appl. No.: 14/274,242

(22) Filed: May 9, 2014

(65) Prior Publication Data
US 2014/0304737 A1 Oct. 9, 2014

Related U.S. Application Data

(63) Continuation of application No. 13/697,719, filed as application No. PCT/KR2010/004099 on Jun. 24, 2010, now Pat. No. 8,763,043.

(30) Foreign Application Priority Data

May 14, 2010 (KR) ........................ 10-2010-0045388

(51) Int. Cl.
*G06F 3/00* (2006.01)
*G06F 13/00* (2006.01)
(Continued)

(52) U.S. Cl.
CPC ......... *H04N 21/637* (2013.01); *G06F 1/3203* (2013.01); *H04L 12/12* (2013.01);
(Continued)

(58) Field of Classification Search
CPC ............. H04N 21/637; H04N 21/4436; H04N 21/42204; H04N 21/47; H04N 21/64322;
(Continued)

(56) References Cited

U.S. PATENT DOCUMENTS 6,337,719 B1 1/2002 Cuccia
7,454,773 B2 11/2008 Pugel et al.
(Continued)

FOREIGN PATENT DOCUMENTS

JP 2000-59752 A 2/2000
JP 2004193825 A 7/2004
KR 10-2007-0066791 A 6/2007

*Primary Examiner* — Oschta Montoya
(74) *Attorney, Agent, or Firm* — Dentons US LLP (57) ABSTRACT

Disclosed are a digital TV and a method for controlling same. The method for controlling a digital TV according to one embodiment of the present invention includes: displaying a user interface (UI) capable of selecting the standby mode for a power-off operation; and disconnecting the power source for a display panel so as to enter the standby mode when the standby mode is set through the UI in the power-off operation, and a power-off command is received. The standby mode includes a lower standby mode based on the operation of the digital TV and a network function, and the digital TV in the standby mode stops AV channel communication and performs SI channel communication.

14 Claims, 6 Drawing Sheets

(51) Int. Cl.
*H04N 5/445* (2011.01)
*H04N 21/637* (2011.01)
*G06F 1/32* (2006.01)
*H04L 12/12* (2006.01)
*H04N 5/63* (2006.01)
*H04N 21/443* (2011.01)
*H04N 21/422* (2011.01)
*H04N 21/47* (2011.01)
*H04N 21/643* (2011.01)
*H04N 21/6587* (2011.01)
*H04N 21/41* (2011.01)
*H04N 21/478* (2011.01)

(52) U.S. Cl.
CPC ........... *H04N 5/63* (2013.01); *H04N 21/4131* (2013.01); *H04N 21/42204* (2013.01); *H04N 21/4436* (2013.01); *H04N 21/47* (2013.01); *H04N 21/478* (2013.01); *H04N 21/64322* (2013.01); *H04N 21/6587* (2013.01); *Y02B 60/30* (2013.01); *Y02B 60/32* (2013.01); *Y02B 60/34* (2013.01)

(58) Field of Classification Search
CPC ........... H04N 21/6587; H04N 21/4131; H04N 21/478; H04N 5/63; Y02B 60/34; Y02B 60/32; Y02B 60/30; G06F 1/3203; H04L 12/12

See application file for complete search history.

(56) References Cited

U.S. PATENT DOCUMENTS

| | | |
|---|---|---|
| 8,004,616 B2 | 8/2011 | Kitamura |
| 8,473,994 B2 | 6/2013 | Blackburn et al. |
| 2002/0178387 A1 | 11/2002 | Theron |
| 2004/0148632 A1 | 7/2004 | Park et al. |
| 2007/0046833 A1 | 3/2007 | Kitamura |
| 2009/0064266 A1* | 3/2009 | Wollmershauser ..... H04L 12/66 725/134 |
| 2010/0053440 A1 | 3/2010 | Mortensen |
| 2010/0141153 A1 | 6/2010 | Recker et al. |
| 2010/0162019 A1* | 6/2010 | Kumar .................. G06F 1/3203 713/323 |
| 2011/0150431 A1* | 6/2011 | Klappert ................ H04N 7/163 386/296 |
| 2012/0302267 A1 | 11/2012 | Haines et al. |

* cited by examiner

DIGITAL TV AND METHOD FOR CONTROLLING SAME

This application is a Continuation Application of U.S. application Ser. No. 13/697,719 filed on Jan. 24, 2013, which claims benefit of PCT/KR2010/004099 filed on Jun. 24, 2010 and Korean Patent Application No. 10-2010-0045388 filed on May 14, 2010, all of which are incorporated herein by reference.

TECHNICAL FIELD

The present invention relates to a digital TV and a control method therefor, and more particularly, to a digital TV for providing a standby mode during power OFF thereof and operating as a network device according to the standby mode, and a control method therefor.

BACKGROUND ART

TVs have been used for a long time as home electronic devices, mainly as video playback devices. However, with the development of image media, digital TVs have come into use and, with the spread of the Internet, digital TVs have expanded functions and ranges thereof as multi-purpose composite devices rather than as video playback devices.

Recently, as unidirectional broadcasting has changed into bidirectional broadcasting due to the development of communication technology such as the Internet, the boundary between broadcasting and communication is blurring. It is therefore possible to perform communication between various electronic devices and to form various scales of networks.

In the case of home electronic devices, communication between the electronic devices, for example, between a TV, a refrigerator, an air conditioner, an audio system, and a telephone may be performed and a home network to which the electronic devices are connected is being formed. In such a home network environment, the roles of a TV having optimal display performance and most frequent use have become more important.

In the case of digital TVs capable of performing bidirectional communication, for example, over the Internet, it is very important to perform functions not only as an image display device but also as a network device, as opposed to conventional TVs. Accordingly, there are cases in which a network function should operate even when a user powers off the digital TV.

DETAILED DESCRIPTION OF THE INVENTION

Technical Problems

An object of the present invention devised to solve the problem lies in providing a digital TV for offering a network function and improving user convenience and a control method therefor.

Technical Solutions

To achieve the above technical object, a method of processing a standby mode at a digital television comprises displaying User Interface (UI) for selecting the standby mode for an operation of power off of the digital television, and entering the standby mode and cutting a power supply to a display panel of the digital television when the standby mode is set up during the operation of the power off by the UI and when command for the power off of the digital television is received, wherein the standby modes includes sub standby modes related to a network function of the digital television and an operation of the digital television, and wherein the digital television of the standby mode is configured to stop processing data of an Audio/Video (AV) channel and perform processing data of Service Information (SI) channel.

The sub standby modes include at least one of a network standby mode where the digital television is operated as a network Access Point (AP), a Bluetooth standby mode where the digital television is operated by receiving a Bluetooth input, a record mode for recording a broadcasting service, and a home server mode where the digital television is operated as a home network server.

The digital television of the standby mode receives at least one of software download information, application upgrade information, network device controlling information, and SI via the SI channel.

The SI includes at least one of channel list information, program guide information, Video on Demand (VOD) list information, and widget information.

The digital television of the standby mode receives control information for controlling external devices connected to a home network via the SI channel.

The control information includes power information for controlling power of the external devices connected to the home network.

To achieve the above technical object, a digital television for processing a standby mode comprises a video output processor configured to process video data, a display panel configured to display the processed video data, a network interface configured to perform a network communication, an external input receiver configured to receive an external input signal, and a main processor configured to control the video output processor to process User Interface (UI) for selecting a standby mode for an operation of power off of the digital television and wherein the main processor is further configured to control cutting a power supply to the display panel when the standby mode is set up during the operation of the power off by the UI and when command for the power off of the digital television is received, wherein the main processor is further configured to control entering the standby mode by stopping processing data of an Audio/Video (AV) channel and performing processing data of Service Information (SI) channel, and wherein the standby modes includes sub standby modes related to a network function of the digital television and an operation of the digital television.

The sub standby modes include at least one of a network standby mode where the digital television is operated as a network Access Point (AP), a Bluetooth standby mode where the digital television is operated by receiving a Bluetooth input, a record mode for recording a broadcasting service, and a home server mode where the digital television is operated as a home network server.

The digital television of the standby mode receives at least one of software download information, application upgrade information, network device controlling information, and SI via the SI channel.

The SI includes at least one of channel list information, program guide information, Video on Demand (VOD) list information, and widget information.

The digital television of the standby mode receives control information for controlling external devices connected to a home network via the SI channel.

The control information includes power information for controlling power of the external devices connected to the home network.

Advantageous Effects

According to the present invention, the digital TV may use a standby mode to perform a network function while reducing power consumption.

According to the present invention, the digital TV may download and update information necessary for service access and service use through a network in a standby mode to improve user convenience and system efficiency. Moreover, it is not necessary to boot the digital TV when the digital TV accesses services through the network, so that a boot time and a service access time of the digital TV may be remarkably shortened.

According to the present invention, the digital TV may access a home network and a smart grid network even in a power OFF state, thereby performing a home networking function and a power control function.

According to the present invention, the digital TV may provide a UI through which a standby mode may be selected, so that a user may select operation during power OFF according to a user network environment.

According to the present invention, the digital TV may provide various standby modes so as to select a mode suitable for a home network environment and a digital TV network environment, thereby reducing unnecessary power consumption and providing a user-specific standby mode for power OFF.

BEST MODE FOR CARRYING OUT THE INVENTION

Hereinafter, constructions and operations of the present invention will be described in connection with embodiments with reference to the accompanying drawings. The constructions and operations of the present invention, which are shown in the drawings and described with reference to the drawings, are described in connection with at least one embodiment, and are not intended to limit the technical spirit of the present invention, and a core construction and operation thereof.

Most terms disclosed in the present invention are defined in consideration of functions of the present invention and correspond to general terms well known in the art and may vary according to intention of those skilled in the art, usual practices, or introduction of new technologies. Some of the terms mentioned in the description of the present invention may have been selected by the applicant at his or her discretion, and in such cases the detailed meanings thereof will be described in relevant parts of the description herein. Thus, the terms used in this specification should be interpreted based on the substantial meanings of the terms and the whole content of this specification rather than their simple names or meanings.

In the case of recently distributed digital TVs, performance thereof has been remarkably enhanced with digitalization of reception and display media. Digital TVs capable of reproducing images of a full HD level and providing Dolby stereo 5.1-channel sound are coming onto the market. Accordingly, as there is an increased demand for reproducing various multimedia files using the digital TV having a large-sized screen, high-definition image display, and high-quality sound, digital TVs capable of receiving multimedia files from various input devices and outputting the multimedia files are being commercially used.

In addition to providing high-definition images and high-quality sound, digital TVs having a network communication function with the development of broadcast communication technology are also being commercially used. In more detail, as a digital TV is connected to a network such as a cable network or the Internet, the digital TV is able to not only receive and reproduce content but also transmit a variety of data. Accordingly, it is possible to provide various services using bidirectional communication.

Hereinbelow, a digital TV refers to a TV which is capable of performing communication with peripheral devices and external devices using the Internet, a cable, a wireless communication network, etc. A description may be given focusing upon an Internet Protocol TV (IPTV) or a cable TV as an example, for convenience of description.

With development of network communication technology, various electronic devices including a digital TV have become interoperable. In addition, techniques for the configuration and control of a home network are being developed.

Figure 1:
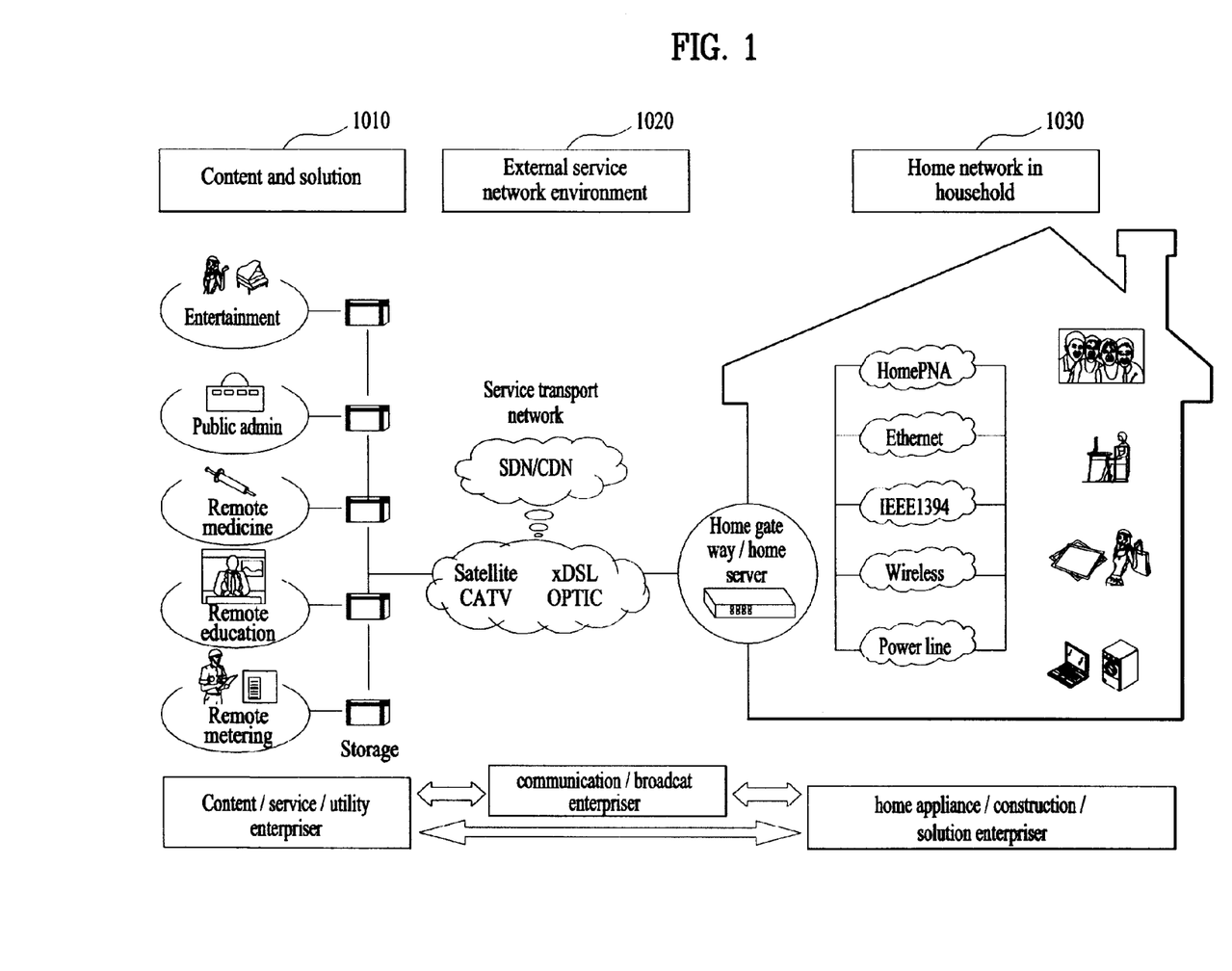
FIG. 1 is diagram illustrating the concept of a home network according to an exemplary embodiment of the present invention.

FIG. 1 is diagram illustrating the concept of a home network according to an exemplary embodiment of the present invention.

A home network refers to a network into which information home appliances are integrated so as to perform communication therebetween to process, manage, transfer, and store information. In FIG. 1 and in this embodiment, a description will be given of a home network configured at home, i.e. in one household unit. However, a home network in the present invention refers to a network configured in a physical or server unit such as one room, floor, or building of a public office, company, hotel, etc. rather than a household.

A home network basically include a home server/home gateway technique for connecting an external access network to the home network, a middleware technique for providing user convenience, and various wired/wireless home network standards for constructing infrastructure of the home network.

In FIG. 1, a home network 1030 is connected via an external service network 1020 to a service such as content and solution 1010 or to a provider of such a service.

The content and solution 1010 may be provided by a service provider. Physically, the home network 1030 may be connected to a server of the service provider through the external service network 1020.

The external service network 1020 is a transport network for transporting and managing content, services, etc. and includes an Internet network, a mobile communication network, a broadcast network, a cable network, and a satellite network.

The home network 1030 is a network through which home appliances such as a TV, a computer, a telephone, and a refrigerator in a household are interoperable using various communication techniques.

Figure 2:
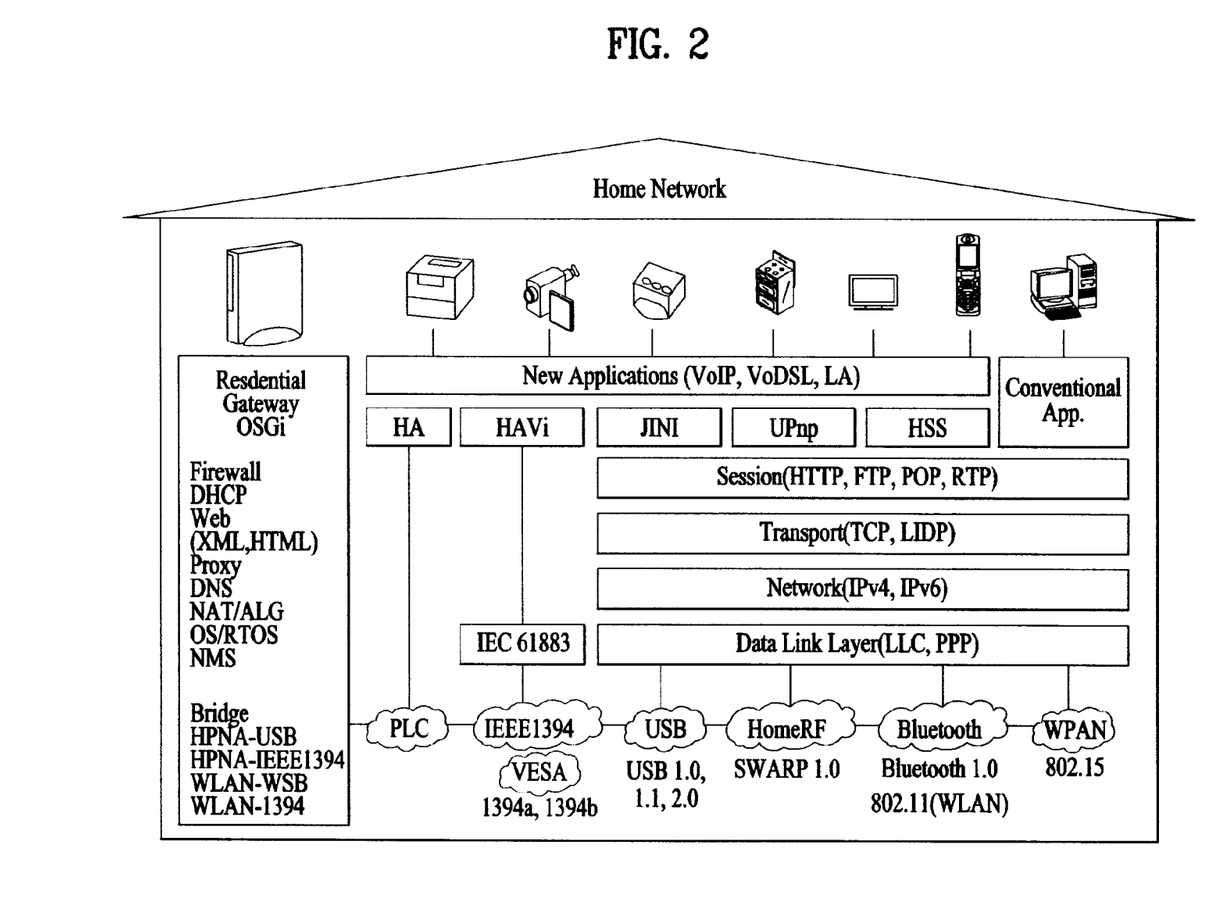
FIG. 2 is a diagram illustrating the configuration of a home network according to an exemplary embodiment of the present invention.

FIG. 2 is a diagram illustrating the configuration of a home network according to an exemplary embodiment of the present invention.

In FIG. 2, the home network is configured such that a printer, a camcorder, a digital TV, a computer, etc. are interconnected to each other via a gateway and these devices may be networked using plural communication techniques. Home networking technology may be roughly divided into wired home networking technology including a telephone line, a power line, Ethernet, and IEEE1394 USB and wireless home networking technology including a wireless LAN of an IEEE 802.11x series, home Radio Frequency (RF), Bluetooth, Ultra Wide Band (UWB), ZigBee, and Hiper-LAN.

It is possible to perform power control using the home network configured in this way. Recently, to solve problems of power control and resource distribution, studies and developments on a smart grid (an intelligent power grid) for combining an existing power grid and a network technique are underway.

Figure 3:
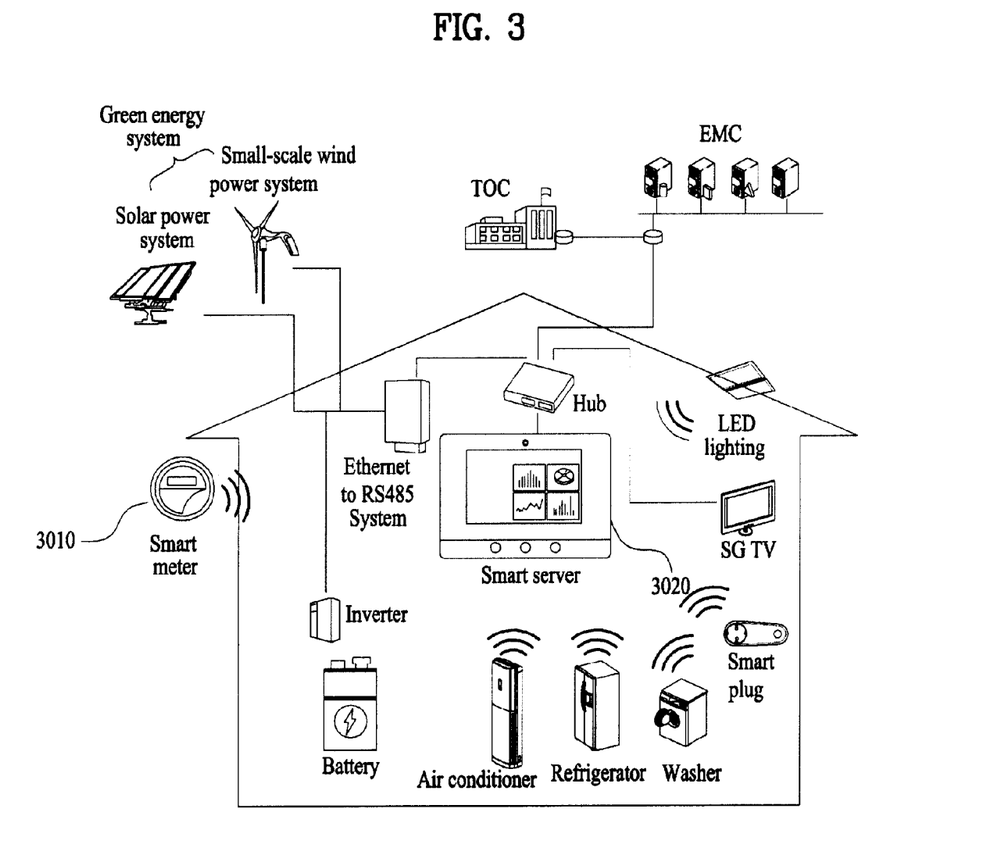
FIG. 3 is a diagram illustrating a home power control network, which is an element of a smart grid, and a communication flow of the power control network according to an exemplary embodiment of the present invention.

FIG. 3 is a diagram illustrating a home power control network, which is an element of a smart grid, and a communication flow of the power control network according to an exemplary embodiment of the present invention.

In FIG. 3, the power control network is configured for power control of home appliances and/or a home network and includes a smart meter 3010 for metering power supplied for power control in a household and a smart server 3020 for controlling power supplied to a household and power distributed to electric products in a household.

The smart server 3020 may optimally control power consumption in a household by controlling power metered by the smart meter 3010 and power consumed in various networked home appliances. In this case, power control information of the smart server 3020, the smart meter 3010, and the home appliances may be transmitted and received using the home network described in association with FIG. 1 and FIG. 2.

In the home network and a smart grid environment using the home network, a digital TV performs an important role. The digital TV corresponds to an electronic device which is most frequently used at home and has optimal display performance in providing a user with details such as operation and situations for the home network and power control. In this case, however, the network function of the digital TV is emphasized.

If the digital TV performs a network function, operation of the digital TV when the digital TV is powered off needs to be set because, unlike other electronic devices in the home network, power ON/OFF operations of the digital TV is frequently generated. Accordingly, a standby mode for providing necessary functions while reducing power consumption of the digital TV may be necessary.

In the standby mode, only a display panel of the digital TV may be tuned off. However, as the digital TV performs various functions, the standby mode is optional. According to user environment, it is unnecessary to consume power even when the digital TV is powered off using the standby mode in an environment in which the digital TV does not need to be interoperable with the home network or other electronic devices. Even though the home network is constructed, it may be sufficient to supply power only to a prescribed part of the digital TV according to the function of the digital TV in the user environment or the constructed home network. Therefore, the present invention is intended to provide a User Interface (UI) such that a user can select a standby mode of the digital TV during power ON/OFF input.

Figure 4:
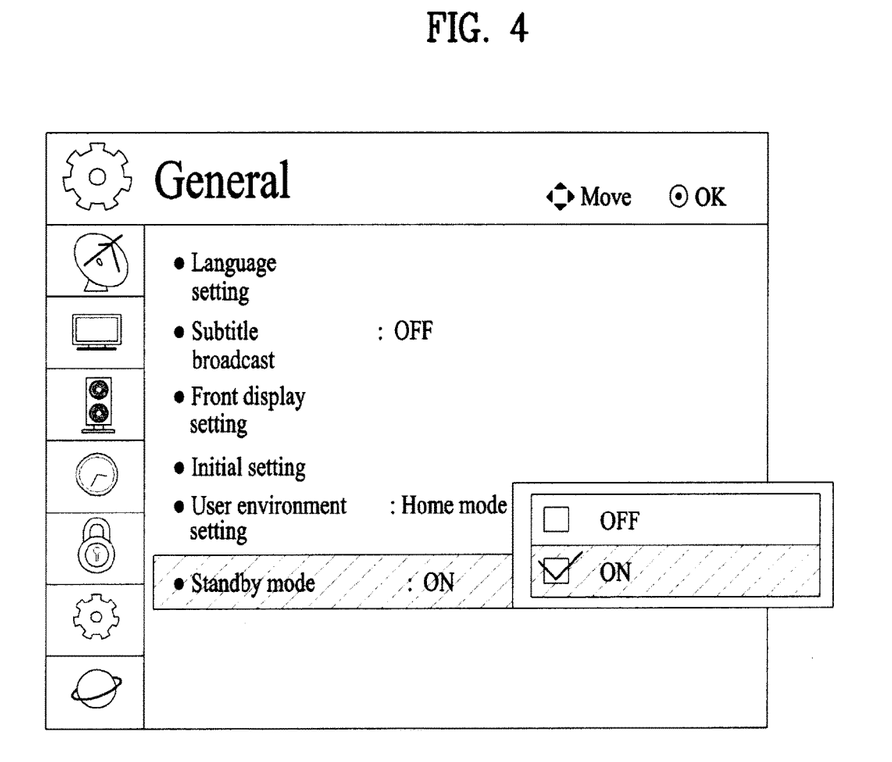
FIG. 4 is a diagram illustrating a UI, displayed by a digital TV, through which whether to enter a standby mode can be selected during power OFF according to an exemplary embodiment of the present invention.

FIG. 4 is a diagram illustrating a UI, displayed by a digital TV, through which whether to enter a standby mode can be selected during power OFF according to an exemplary embodiment of the present invention.

When a user configures an environment as shown in FIG. 4, a UI for selecting a standby mode in an environment setting mode may be provided. A digital TV may provide a UI capable of selecting ON or OFF for standby mode setting during power OFF as shown in FIG. 4.

If a user selects 'OFF' of the standby mode, the standby mode is not set. Accordingly, if the digital TV is powered off, all power supply to the digital TV may be out off. If the digital TV does not perform an additional network function, is not connected to a network, or does not play a major role in the network even though the digital TV is connected to the network, power consumption can be minimized by completely cutting off power of the digital TV.

If a user selects 'ON' of the standby mode, the standby mode is set. That is, if the user turns off the digital TV, the digital TV enters the standby mode while disabling only operation of a display panel. In the standby mode, since power is supplied to devices except for the display panel of the digital TV and elements necessary for display, the digital TV may operate as an Access Point (AP) of the network or a network server or perform all operations such as scheduled recording except for a display function through the panel.

As an embodiment, when using an IP network, the digital TV may receive and process audio and video signals through an Audio/Video (AV) channel and receive and process additional data signals, except for the audio and video signals, through a System Information (SI) channel. As another embodiment, when using a cable network, the digital TV may receive and process the audio and video signals through an in-band channel and receive and process the additional data signal through an out-of-band channel. Hereinafter, a channel receiving the audio and video signals is referred to as an AV channel and a channel receiving data signals except for the audio and video signals is referred to as an SI channel.

If the digital TV is an ON state, the digital TV receives and processes audio and video signals through the AV channel and receives and processes additional data signals through the SI channel, thereby displaying necessary information. If the standby mode is not set, since the digital TV does not drive network equipment and cuts off all power supply, the digital TV is unable to receive and process the audio and video signals and the additional data signals.

If the standby mode is set as in the exemplary embodiment of the present invention, since power supplied to the display panel is cut off, the digital TV may stop AV channel communication for receiving and processing the audio and video signals which are not provided to a user. However, the digital TV does not stop SI channel communication and may perform operations, such as software upgrade, broadcast guide information reception and update, and SI information reception and update, which may increase system load while a user watches the digital TV. The digital TV may continue to perform home network communication through SI channel communication and receive and process control signals of an external device connected to a home network and power control signals.

In relation to the above-described home network and power control environment, the digital TV may receive external device control information associated with the home network or receive power control information even in the standby mode. Accordingly, if it is desired for a user to confirm the network related information through the digital TV, the information may be immediately provided if power is supplied only to the display panel. Namely, a boot time delay generated due to power ON/OFF is not necessary and the network information, related external device control information, and power control information may be provided to users at the same time with power ON.

Even in the standby mode, the digital TV does not need to necessarily supply power to all devices except for a display related device. As the digital TV has various functions, various sub modes of the standby mode may be provided. Therefore, the present invention provides a sub standby mode in addition to the standby mode through a UI of the digital TV.

Figure 5:
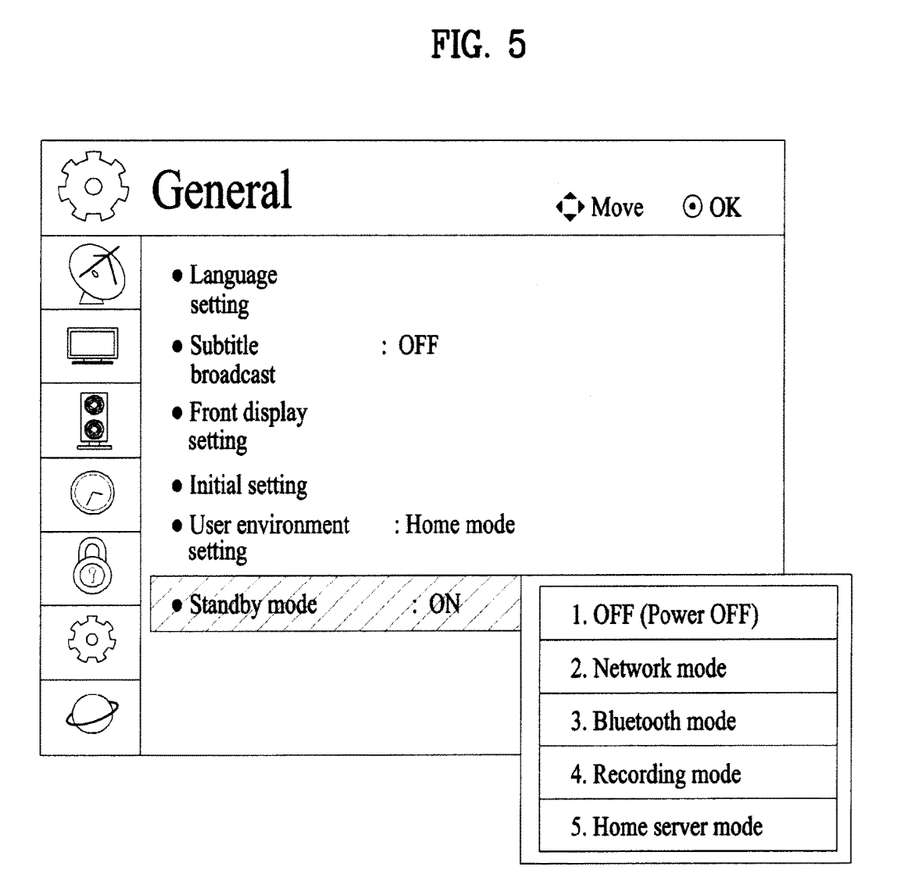
FIG. 5 is a diagram illustrating a UI, displayed by a digital TV, through which a sub standby mode can be selected according to an exemplary embodiment of the present invention.

FIG. 5 is a diagram illustrating a UI, displayed by a digital TV, through which a sub standby mode can be selected according to an exemplary embodiment of the present invention.

As shown in FIG. 5, a sub standby mode having various modes may be provided in addition to the standby mode. In FIG. 5, the sub standby mode includes 1. OFF, 2. Network mode, 3. Bluetooth mode, 4. Recording mode, and 5. Home server mode.

In 'OFF' mode of the sub standby mode, power is not supplied to all devices of the digital TV. The 'OFF' mode may correspond to operation of selection of 'OFF' in the standby mode.

In 'Network mode', the digital TV enables only the most fundamental function for network communication. That is, in an environment such as a home network, since the digital TV may serve as an AP, the digital TV may enter a standby state by supplying power only to a network device (e.g. LAN port) necessary for basic operation of the AP.

In 'Bluetooth mode', the digital TV is in a standby state by supplying power only to a Bluetooth input/output device. In a home network environment, an input signal to the digital TV may be not only a signal input through a remote controller of the digital TV but also a signal input through other digital electronic devices using Bluetooth communication. In this case, the digital TV should respond to Bluetooth signals of such devices even during power OFF thereof. Accordingly, in 'Bluetooth mode', the digital TV may enter the standby state by supplying power only to the Bluetooth input/output devices or devices interoperable with the Bluetooth input/output devices. In this embodiment, Bluetooth communication is provided as an example of the sub standby mode. However, if the home network is configured using other communication protocols, the standby mode may be provided by supplying power to a corresponding communication terminal.

In 'Recording mode', the digital TV may be in a standby state by supplying power only to devices necessary for performing a recoding function. Namely, power should be supplied even to a CPU and storage media such as a USB and an HDD, necessary for recording. Notably, since power is supplied only while recording is performed, power is cut off during time except for a recoding time. The digital TV may perform recoding by supplying power to the CPU and storage media at a recording time or a scheduled time through a nonvolatile memory in which the recording time or recording schedule is stored.

In 'Home server mode', the digital TV may enter the standby state by supplying power to most devices including the CPU except for the display panel. In the home network or a network for power control, the digital TV may operate as one server and, in this case, the digital TV should cut off power supplied only to the display panel and drive other devices even when power OFF is selected, thereby managing and controlling the network.

According to embodiments, a UI for simultaneously selecting one or more modes of the sub standby mode may be provided by configuring the UI such that a plurality of modes for the sub standby mode can be checked or a UI may be configured so as to provide descriptions of the modes of the sub standby mode as the UI.

Figure 6:
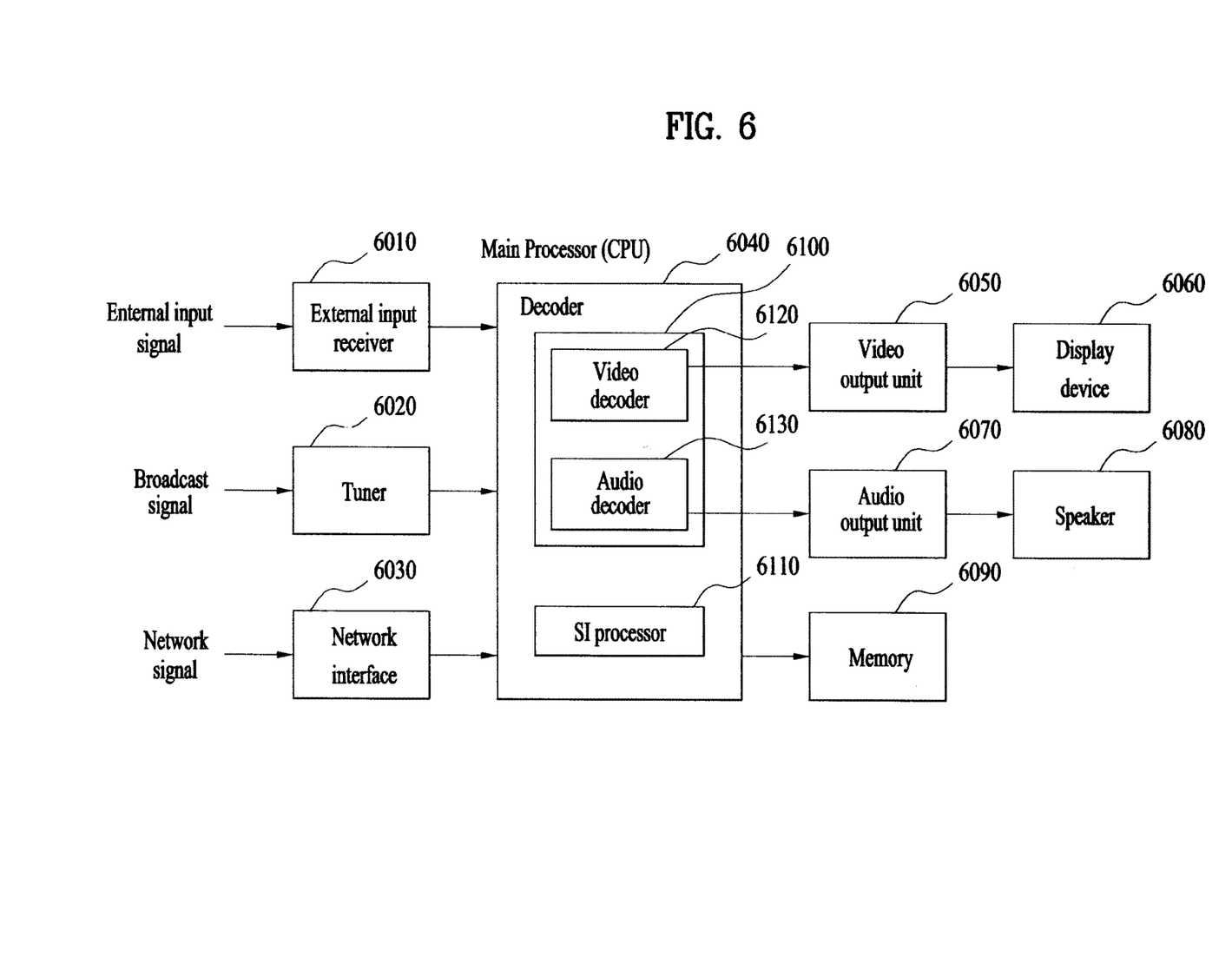
FIG. 6 is a diagram illustrating the configuration of a digital TV according to an exemplary embodiment of the present invention.

FIG. 6 is a diagram illustrating the configuration of a digital TV according to an exemplary embodiment of the present invention.

The digital TV according to an exemplary embodiment of the present invention includes an external input receiver 6010, a tuner 6020, a network interface 6030, a main processor (CPU) 6040, a video output unit 6050, a display device 6060, an audio output unit 6070, a speaker 6080, and a memory 6090. The main processor 6040 may further include a decoder 6100 and an SI processor 6110. The decoder 6100 may further include a video decoder 6120 and an audio decoder 6130. Hereinbelow, operation of the digital TV shown in FIG. 6 will be described.

The external input receiver 6010 receives an external input signal through a remote controller or a Bluetooth device and transfers the external input signal to the main processor 6040. The tuner 6020 receives and processes a broadcast signal transmitted as an RF signal or a satellite signal and transfers the broadcast signal to the main processor 6040. The network interface 6030 receives a network signal transmitted through a network to which the digital TV is connected and transfers the network signal to the main processor 6040. The network signal may include an IP network signal or a cable signal. In another embodiment, the cable signal may be received through the tuner 620.

The main processor 6040 processes various signals input to the digital TV and controls elements of the digital TV shown in FIG. 6 and elements not shown in the digital TV of FIG. 6. The main processor 6040 decodes audio/video signals received through the decoder 6040. The audio signal may be decoded in the audio decoder 6130 and the video signal may be decoded in the video decoder 6120. The main processor 6040 may decode/process SI through the SI processor 6110. In the exemplary embodiment of FIG. 6, the SI processor 6110 processes various data signals such as a home network control signal and a power control signal as well as an SI signal included in the broadcast signal, as a device for processing data signals except for the audio/video signals.

The video output unit 6050 processes the decoded video signal and transfers the processed video signal to the display device 6060. The video output unit 6050 may function as an On Screen Display (OSD) processor and perform operations including subtitle processing, a PIP function, and display of information processed in the SI processor 6110. The display device 6060 may be a projector, a display panel, etc.

The audio output unit 6070 processes the decoded audio signal and outputs the processed audio signal through the speaker 6080.

The memory 6090 stores audio data, video data, or SI data generated from the main processor 6040.

Hereinafter, the above-described devices of the digital TV will be described in relation to the standby mode explained in FIG. 4 and FIG. 5.

In the standby mode of FIG. 4, the digital TV may cut off power supplied to devices necessary for outputting images and voice. That is, upon receiving a power OFF command, the digital TV may cut off power supplied to the display device 6060, the video output unit 6050, the speaker 6080, and the audio output unit 6070. Optionally, the digital TV may cut off power supplied only to the display device 6060 according to power consumption and a use method of the digital TV. The digital TV may stop receiving the audio/video signals through the AV channel by controlling the tuner 6020 and the network interface 6030.

In the standby mode of FIG. 5, the digital TV cuts off power supplied to all devices in 'OFF' mode. However, the external input receiver 6010 may receive a power ON command signal and thus the digital TV may be powered on by the power ON command.

In 'Network mode', the digital TV may operate as an AP of a network even in a power OFF state by supplying power to the network interface 6030.

In 'Bluetooth mode', the digital TV may perform necessary operations in response to a Bluetooth signal even in the power OFF state by supplying power to the external input receiver 6010 or a Bluetooth communication device (not shown) performing Bluetooth communication.

In 'Recording mode', recording is performed at a recording time or a scheduled time by supplying power to the main processor 6040, a receiver (the tuner 6020 in the case of a broadcast signal and the network interface 6030 in the case of a network signal) for receiving a signal including a recording program, and the memory 6090 and power is not supplied thereto at the other time.

In 'Home server mode', power is supplied to the network interface 6030 and the main processor 6040 and, when necessary for network operation, power may be supplied to other devices according to operation of the digital TV.

As one embodiment, menus of the sub standby mode of FIG. 5 may be configured such that whether to supply or cut off power supplied to each device included in the digital TV can be determined. In an exemplary embodiment of the present invention, the UI for providing 'OFF' mode, 'Network mode', 'Bluetooth mode', 'Recording mode', and 'Home server mode' is shown in order of the number of internal devices to which power should be supplied, starting from a small number of internal devices. However, according to embodiments, the standby mode may be provided in another order or as another name and the UI may be provided such that a plurality of standby modes can be selected from each standby mode.

In the standby mode as shown in FIG. 4 or FIG. 5, the digital TV may receive and process a variety of information as a constituent element of a home network.

When a user views a program through the digital TV, the digital TV mainly receives and processes the program for processing efficiency and user convenience. If the digital TV receives and processes necessary information in the standby mode during which a user does not view the program, user convenience and system efficiency can be improved.

The digital TV may receive and process software download information, application upgrade information, network device control information, SI information, etc. through the SI channel in the standby mode.

The software download information includes information necessary for determining whether there is an upgrade item for software stored in the digital TV through communication with a designated server and, when necessary, for downloading and upgrading the corresponding item. The application upgrade information includes information necessary for storing information about the occurrence of an update item indicated by a server in the case of an unbound application and for performing upgrade by starting download while entering the standby mode.

The network device control information includes information necessary for a server to control a Set-Top Box (STB) or a digital TV. That is, the server may reboot the STB or digital TV or requests device information of the STB or digital TV and it is desirable that communication of such information be performed in the standby mode.

The SI information includes SI information about broadcast, services, channels, and programs received through the broadcast signal or network signal. In the standby mode, the digital TV may stop the video/audio decoder but receive and process the SI information. The SI information may include channel list information of available channels, viewable program guide information (e.g. EPG information), a list of Video On Demand (VOD) which allows users to watch video on demand, and widget information including a list of widgets which can be used in the digital TV or through download and including descriptions for the widgets.

If the digital TV is connected to the home network, the digital TV may receive control information of external devices connected to the home network (e.g. other home appliances connected to the home network). As one embodiment, the digital TV may control the external devices, receive information about connection states and use states of the external devices, and transmit a proper response. As one embodiment, if there is a phone call or an external visitor, the digital TV may receive a control signal from a speaker phone, etc., output the control signal through a display device or a voice device, and enter the standby mode when a corresponding event is ended. That is, the digital TV may receive a control signal according to functions of the home network and functions performed by the digital TV set in the home network and perform corresponding functions.

In a smart grid environment, the digital TV of the standby mode may receive power control information of an external device connected to the home network. The digital TV may display power control of a smart grid network. In this case, the digital TV may receive power control information of the external device in the standby mode from a smart server, a smart meter, or each home appliance and store the received power control information. The digital TV may transmit power control information thereof to an external device such as a smart server.

According to the present invention, the digital TV may use a standby mode to perform a network function while reducing power consumption.

According to the present invention, the digital TV may download and update information necessary for service access and service use through a network in a standby mode to improve user convenience and system efficiency. Moreover, it is not necessary to boot the digital TV when the digital TV accesses services through the network, so that a boot time and a service access time of the digital TV may be remarkably shortened.

According to the present invention, the digital TV may access a home network and a smart grid network even in a power OFF state, thereby performing a home networking function and a power control function.

According to the present invention, the digital TV may provide a UI through which a standby mode may be selected, so that a user may select operation during power OFF according to a user network environment.

According to the present invention, the digital TV may provide various standby modes so as to select a mode suitable for a home network environment and a digital TV network environment, thereby reducing unnecessary power consumption and providing a user-specific standby mode for power OFF.

The method according to the present invention may be embodied as a program command which can be executed through various computer means and may be recorded in computer readable media. The computer readable media may include a program command, a data file, and data structure, alone or in combination. The program command recorded in the media may be designed and configured specially for the present invention, or may be known to and used by those skilled in the computer software industry. The computer readable media include magnetic media such as a hard disk, a floppy disk, and a magnetic tape, optical media such as a CD-ROM and a DVD, magneto-optical media such as a floptical disk, and a hardware apparatus specially designed to store and perform a program command such as ROM, RAM, and a flash memory. Examples of a program command include a high level language code executable by a computer using an interpreter as well as a machine language code generated by a compiler. The hardware device may be configured to operate as one or more software modules to implement the present invention or vice versa.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be within the scope of the invention.

INDUSTRIAL APPLICABILITY

As described above, the present invention may be totally or partially applied to a digital broadcast system and a home network system.

The invention claimed is:

1. A method of processing a standby mode at a digital television, the method comprising;
    entering a standby mode after the standby mode is selected during a display of a User interface (UI) for selecting the standby mode,
    wherein the digital television of the standby mode performs a home network function, wherein the digital television of the standby mode stops processing data of an Audio/Video (AV) program,
    wherein the digital television of the standby mode receives control information for controlling an external device wirelessly connected to a home network, further the external device does not include any components within the digital television,
    controlling an operation of the external device based on the wirelessly received control information via the home network:
    upgrading software stored in a memory of the digital television if it is determined that there is an upgrade item of the software through the communication with a designated server while stopping processing data of an Audio-Video (AV) program in the standby mode,
    wherein the control information is received from an outside of the home network via a network interface; and
    wherein the network interface corresponds to an internet protocol (IP) network.

2. The method of claim 1, further comprising:
    receiving status information informing a status of the external device controlled based on the received control information from the external device; and
    reporting the status of the external device.

3. The method of claim 2, further comprising:
    storing the received status information.

4. The method of claim 1, wherein the control information includes an external device on/off information for controlling on/off operation of the external device.

5. The method of claim 1, wherein the digital television of the standby mode operates as an Access Point (AP) during the home network function.

6. The method of claim 1, wherein the digital television of the standby mode cuts a power supply to a display panel of the digital television.

7. The method of claim 1, wherein the control information is received via a bluetooth interface.

8. A digital television for processing a standby mode, the digital television comprising:
    a network interface;
    a memory; and
    a controller coupled with the network interface and the memory,
    wherein the controller is configured to:
    enter a standby mode after the standby mode is selected during a display of a User interface (UI) for selecting the standby mode,
    wherein the controller is further configured to upgrade software stored in a memory of the digital television if it is determined that there is an upgrade item of the software through the communication with a designated server while stopping processing data of an Audio-Video (AV) program in the standby mode,
    wherein the digital television of the standby mode performs a home network function,
    wherein the digital television of the standby mode stops processing data of an Audio/Video (AV) program,
    wherein the digital television of the standby mode receives control information for controlling an external device wirelessly connected to a home network, further the external device does not include any components within the digital television,
    controlling an operation of the external device based on the wirelessly received control information via the home network:
    wherein the control information is received from an outside of the home network via a network interface: and
    wherein the network interface corresponds to an internet protocol (IP) network.

9. The digital television of claim 8, further configured to:
receive status information informing a status of the external device controlled based on the received control information from the external device; and
report the status of the external device.

10. The digital television of claim 9, further configured to:
store the received status information.

11. The digital television of claim 8, wherein the control information includes an external device on/off information for controlling on/off operation of the external device.

12. The digital television of claim 8, wherein the digital television of the standby mode operates as an Access Point (AP) during the home network function.

13. The digital television of claim 8, wherein the digital television of the standby mode cuts a power supply to a display panel of the digital television.

14. The digital television of claim 8, wherein the control information is received via a bluetooth interface.

\* \* \* \* \*